United States Patent [19]

Nishibayashi et al.

[11] Patent Number: 4,966,712

[45] Date of Patent: Oct. 30, 1990

[54] FLOTATION COLLECTOR AND METHOD FOR TREATMENT OF INORGANIC SUBSTANCE-CONTAINING WATER SYSTEM BY USE THEREOF

[75] Inventors: Hideyuki Nishibayashi, Ibaraki; Yoshiaki Urano, Kawasaki; Nobuhiro Matsuura; Yoshiyuki Hozumi, both of Yokohama; Fumio Watanabe, Kawasaki, all of Japan

[73] Assignee: Nippon Shokubai Kagaku Kogyo Kabushiki Kaisha, Osaka, Japan

[21] Appl. No.: 304,841

[22] PCT Filed: May 19, 1988

[86] PCT No.: PCT/JP88/00475

§ 371 Date: Jan. 19, 1989

§ 102(e) Date: Jan. 19, 1989

[87] PCT Pub. No.: WO88/09215

PCT Pub. Date: Dec. 1, 1988

[30] Foreign Application Priority Data

May 22, 1987 [JP] Japan ..................... 62-123682

[51] Int. Cl.[5] ..................... B03D 1/016; B03D 1/02; C02F 1/24; C02F 1/56

[52] U.S. Cl. ..................... 210/705; 210/734; 209/166; 526/292.2

[58] Field of Search ............... 210/707, 706, 705, 734, 210/725; 209/166, 167; 526/292.2

[56] References Cited

U.S. PATENT DOCUMENTS

| | | | |
|---|---|---|---|
| 3,256,140 | 6/1966 | Poschmann | 210/705 |
| 3,658,474 | 4/1972 | Rothwell | 210/734 |
| 3,836,512 | 9/1972 | Chu | 210/734 |
| 3,951,791 | 4/1976 | Huang | 210/734 |
| 4,152,307 | 5/1979 | Shibahara | 210/734 |
| 4,190,717 | 2/1980 | Suzuki | 526/292.2 |
| 4,191,645 | 3/1986 | Begala | 210/734 |
| 4,353,818 | 10/1982 | Maslanka | 525/293 |
| 4,355,167 | 10/1982 | Ciccarelli | 526/292.2 |
| 4,360,425 | 2/1982 | Lim et al. | 209/167 |
| 4,444,954 | 4/1984 | Mels | 525/124 |
| 4,454,047 | 6/1984 | Becker | 210/705 |
| 4,454,060 | 6/1984 | Lai | 252/DIG. 2 |
| 4,536,294 | 8/1985 | Guillet | 210/734 |
| 4,656,211 | 4/1987 | Nasu | 525/185 |
| 4,666,981 | 5/1987 | Doura | 525/293 |
| 4,728,438 | 3/1988 | Featherstone | 210/734 |
| 4,741,835 | 5/1988 | Jacques | 210/734 |
| 4,814,101 | 3/1989 | Schieferstein | 252/DIG. 2 |
| 4,931,191 | 6/1990 | Braden | 210/705 |

FOREIGN PATENT DOCUMENTS

| | | | |
|---|---|---|---|
| 592835 | 2/1960 | Canada | 210/734 |
| 640426 | 4/1962 | Canada | 210/734 |
| 0248519 | 12/1987 | European Pat. Off. | |
| 2300620 | 2/1975 | France | 210/705 |
| 55-162362 | 12/1980 | Japan | |
| 1341972 | 12/1973 | United Kingdom | 210/734 |

*Primary Examiner*—David L. Lacey
*Assistant Examiner*—Thomas M. Lithgow
*Attorney, Agent, or Firm*—Burns, Doane, Swecker & Mathis

[57] ABSTRACT

A flotation collector is formed on a copolymer comprising (A) 2 to 95 mol % of a structural unit represented by the general formula I:

(I)

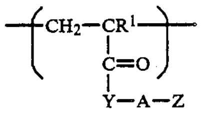

wherein $R^1$ is H or methyl, Y is —O— or —NH—, A is $C_{1\text{-}4}$ alkylene, $C_{2\text{-}4}$ hydroxyalkylene, or phenylene, and Z is

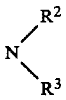 or 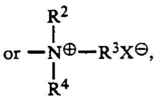 , wherein $R^2$, $R^3$, and $R^4$ are independently H, $C_{1\text{-}12}$ alkyl or $C_{7\text{-}10}$ aralkyl and $X^{\ominus}$ is anion pair, (B) 5 to 98 mol % of a structural unit represented by the general formula II:

(II)

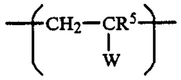

wherein $R^5$ is H or methyl and W is $C_{6\text{-}8}$ aryl,

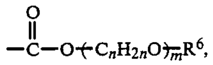

, wherein n is 2 to 4 and m is 0 to 20,

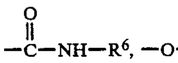

, $-O-R^6$, or 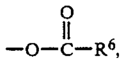 , wherein $R^6$ is $C_{1\text{-}18}$ alkyl, $C_{5\text{-}8}$ cycloalkyl, $C_{7\text{-}10}$ aralkyl, or $C_{6\text{-}18}$ aryl, and (C) 0 to 50 mol % of other structural unit. A method for the treatment of an inorganic substance-containing water system by the use of the flotation collector.

10 Claims, No Drawings

FLOTATION COLLECTOR AND METHOD FOR TREATMENT OF INORGANIC SUBSTANCE-CONTAINING WATER SYSTEM BY USE THEREOF

TECHNICAL FIELD

This invention relates to a flotation collector for use in the separation of inorganic substances from an inorganic substance-containing water system by flotation and to a method for the treatment of an inorganic substance-containing water system by the use of the flotation collector. More specifically, it relates to a flotation collector to be used advantageously, optionally in combination with a frother, for the separation of valuable metals such as copper, lead, zinc, and uranium and valuable minerals such as quartz, mica, fluorite, barite, apatite, and ilmenite or for the recovery of valuable components or removal of unwanted components from plant effluent, sewage, and geothermal water and to a method for the separation, removal, or recovery of inorganic substances from a water system by the use of the flotation collector.

BACKGROUND ART

Heretofore as cationic flotation collectors intended mainly for minerals, hydrochlorides and acetates of such long-chain alkylamines as lauryl amine, tallow amine, and coconut amine have been finding extensive utility.

The flotation collectors (hereinafter referred to briefly as "collectors") based on such long-chain alkylamine salts as mentioned above are deficient in the efficiency for recovery and separation of valuable inorganic substances in the flotation. Particularly, they have a disadvantage that their capacity for performance is greatly impaired by the conditions of flotation such as concentration of co-existing water-soluble inorganic salts, pH and temperature of the water system. The impairment of the capacity for performance is conspicuous when the water system happens to contain water-soluble inorganic salts represented by chlorides, sulfates, carbonates, and phosphates of sodium, potassium, calcium, magnesium, manganese, iron, and aluminum on the order of several thousand ppm. Particularly when the water system subjected to the flotative treatment has a high salt concentration and a high temperature exceeding 70° C like the geothermal water, these collectors effect the recovery only with a low coefficient and can hardly be expected to provide effective flotation. Further, since the long-chain alkylamine salt type collectors have their qualities notably affected by variation in the pH value of the water system, the possible impairment of the capacity is generally precluded by optimizing the pH value of the water system by addition of a pH adjusting agent. This pH adjustment complicates the operation of the flotative treatment and jeopardizes the ease of use of collector.

In the circumstances, the desirability of developing a flotation collector capable of fully manifesting the capacity thereof in effecting flotative recovery and separation at high levels never attained by the conventional collectors even in a water system of high temperature or a water system susceptible of wide pH variation, irrespectively of the amount of water-soluble inorganic salts present in the water system under treatment has been finding recognition.

In recent years, efforts are being continued to promote the utilization of the geothermal water as a stable and clean energy source of lasting reserve. In the utilization of the geothermal water, since the temperature of the geothermal water never fails to fall during the course of the utilization, the inorganic substances, particularly silica, which are retained in a dissolved state in the geothermal water at the initial high temperature are suffered to precipitate in a large amount. These precipitated inorganic substances bring about a serious disadvantage that they are deposited in the form of scale in conduits, heat exchangers, return wells, etc.

To prevent the deposition in the piping of the scale formed mainly of silica (hereinafter referred to as "silica type insoluble component"), various measures are being tried including:

(1) A method which comprises adding an acid to the geothermal water thereby lowering the pH value thereof.

(2) A method which comprises adding a compound of such a polyvalent metal as aluminum, iron, or calcium to the geothermal water thereby inducing aggregation and precipitation of the silica type insoluble component therein.

(3) A method which comprises introducing the geothermal water into a retention tank and retaining it therein until the silica type insoluble component thoroughly aggregates and precipitates therein.

(4) A method which comprises adding such a chemical agent as a surfactant, a water-soluble polymer, an inorganic or organic phosphate, or a chelating agent to the geothermal water thereby inhibiting precipitation of inorganic substances, particularly silica.

(5) A method which comprises adding a cationic surfactant based on a long chain alkyl amine such as lauryl amine salt or tallow amine salt to the geothermal water thereby effecting flotative removal of the silica type insoluble component therefrom.

The method of (1), however, suffers as a problem the corrosion of piping due to the fall of the pH value. The methods of (2) and (3) are uneconomical because of the heavy energy loss suffered to occur during the course of aggregation and precipitation. The method of (4) is not sufficiently effective in thoroughly inhibiting the precipitation of the inorganic substances. The method of (5), though comparatively effective where the amount of inorganic ions present in the geothermal water is small, is not sufficiently effective in flotative removal where the amount of inorganic ions is large. Generally the geothermal water contains a large amount of inorganic ions. No desirable results are obtained, therefore, by increasing the amount of the cationic surfactant to be added. Further, failure to control the pH value at the optimum level results in impairment of quality.

Since the conventional methods suffer from numerous drawbacks, the desirability of developing an economical and feasible method for the treatment of the geothermal water has been finding growing recognition.

An object of this invention, therefore, is to provide a flotation collector for inorganic substances which is not appreciably affected by the presence of water-soluble inorganic salts in a water system under treatment or by the condition of temperature and pH of the water system but is permitted, even at a low application rate, to manifest an outstanding effect in attaining flotative recovery and selection at high levels.

Another object of this invention is to provide a method for the treatment of geothermal water which attains effective separation and removal of the silica type insoluble component which is precipitated in the geothermal water during the utilization of the geothermal water, thereby precluding the otherwise inevitable deposition of the silica type insoluble component in the piping and facilitating the utilization of the geothermal water.

DISCLOSURE OF THE INVENTION

The objects described above are accomplished by a flotation collector for the separation of inorganic substances from an inorganic substance-containing water system, formed of a copolymer having an average molecular weight in the range of 1,000 to 1,000,000 and comprising (A) 2 to 95 mol % of a structural unit represented by the general formula I:

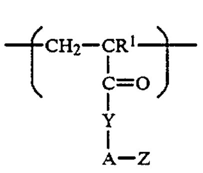

(I)

wherein $R^1$ is hydrogen atom or methyl group, Y is —O— or —NH—, A is alkylene group of 1 to 4 carbon atoms, hydroxyalkylene group of 2 to 4 carbon atoms, or phenylene

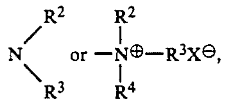

$R^3$, and $R^4$ are independently hydrogen atom, alkyl group of 1 to 12 carbon atoms, or aralkyl group of 7 to 10 carbon atoms, and $X^\ominus$ is anion pair, (B) 5 to 98 mol % of a structural unit represented by the general formula II:

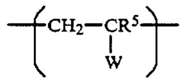

(II)

wherein $R^5$ is hydrogen atom or methyl group, W is aryl group of 6 to 8 carbon atoms,

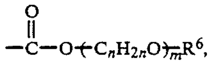

wherein n is an integer in the range of 2 to 4 and m is 0 or an integer in the range of 1 to 20,

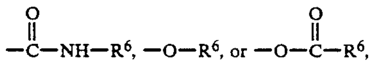

and $R^6$ is alkyl group of 1 to 18 carbon atoms, cycloalkyl group of 5 to 8 carbon atoms, aralkyl group of 7 to 10 carbon atoms, or aryl group of 6 to 18 carbon atoms, and (C) 0 to 50 mol % of other structural unit, providing that the total amount of the structural units (A), (B), and (C) is 100 mol %.

The aforementioned objects are also accomplished by a method for the treatment of an inorganic substance-containing water system, which method comprises adding to the inorganic substance-containing water system the aforementioned copolymer having an average molecular weight in the range of 1,000 to 1,000,000 and comprising 2 to 95 mol % of the structural unit of (A), 5 to 98 mol % of the structural unit of (B), and 0 to 50 mol % of the structural unit of (C), providing that the total amount of the structural units (A), (B), and (C) is 100 mol %, in a proportion of 1 to 20,000 mg/liter thereby effecting flotation of the water system and separating the inorganic substances from the water system.

Best Mode for Carrying Out the Invention

In the general formula I the substituent Y is —O— or —NH—, the substituent A is an alkylene group having 1 to 4, preferably 1 or 2, carbon atoms such as, for example $—CH_2—$, $—CH_2CH_2—$, $—CH_2CH_2CH_2—$, and $—CH_2CH(CH_3)—$ or a hydroxyalkylene group having 2 to 4 carbon atoms such as, for example, $—CH_2CH(OH)CH_2—$. The alkyl group in $R^2$, $R^3$, or $R^4$ is an alkyl group having 1 to 12, preferably 1 to 4 carbon atoms. Typical examples of the alkyl group include methyl, ethyl, n-propyl, isopropyl, n-butyl, isobutyl, sec-butyl, 2-ethylhexyl, and n-dodecyl groups. The aralkyl group therein is an aralkyl group having 7 to 10, preferably 7 or 8, carbon atoms. Typical examples of the aralkyl group include benzyl group, dimethylbenzyl group, and phenetyl group. Typical examples of the anion pair represented by $X^\ominus$include $Cl^\ominus$, $Br^\ominus$, $I^\ominus$, $CH_3SO_4^\ominus$, $HSO_4^\ominus$, $CH_3COO^\ominus$, $C_6H_5COO^\ominus$, and $CH_3C_6H_4SO_3^\ominus$.

Typical examples of the aryl group in W of the general formula II include phenyl group and methylphenyl group. The substituent $R^6$ as a varying organic group in W is an alkyl group of 1 to 18, preferably 1 to 12, carbon atoms, typical examples of which alkyl group include methyl, ethyl, n-propyl, isopropyl, n-butyl, isobutyl, sec-butyl, 2-ethylhexyl, and n-dodecyl groups; a cycloalkyl group of 5 to 8, preferably 6 to 8, carbon atoms, typical examples of which cycloalkyl group include cyclohexyl and dimethylcyclohexyl groups; an aralkyl group of 7 to 10, preferably 7 to 9, carbon atoms, typical examples of which aralkyl group include benzyl, dimethylbenzyl, and phenethyl groups; or an aryl group of 6 to 18 carbon atoms, typical examples of which aryl group include phenyl, methylphenyl, and naphthyl groups. The atomic group, $$-(C_nH_{2n}O)_m-$$

in the general formula II represents a divalent open ring group such as ethylene oxide, propylene oxide, or butylene oxide or a divalent polymer chain of the open ring polymer of such an alkylene oxide as mentioned above. The subscript m is 0 or an integer in the range of 1 to 20, preferably 0 or an integer in the range of 1 to 5.

The copolymer effective as a flotation collector contemplated by the present invention comprises a structural unit (A) represented by the general formula I mentioned above, a structural unit (B) represented by the general formula II mentioned above, and other structural unit (C). The method by which this copolymer is obtained is not specifically limited. The copolymer can be produced by any of the conventional methods available therefor at all. It may be obtained by the method (a) or the method (b) shown below.

The method of (a) comprises copolymerizing a vinyl monomer convertible by polymerization into a structural unit (A) represented by the general formula I, a vinyl monomer convertible by polymerization into a structural unit (B) represented by the general formula II, when necessary, in the presence of other monomer.

The method (b) comprises causing a polymer containing a structural unit (B) represented by the general formula II mentioned above and possessing a structural unit convertible as by the reaction of aminoethylation into a structural unit (A) represented by the general formula I to be modified by the reaction of aminoethylation, the reaction of interesterification, the reaction of amide exchange, or the Mannich reaction.

Examples of the vinyl monomer convertible into the structural unit (A) in the method (a) include dimethylaminoethyl (meth)acrylate, diethylaminoethyl (meth)acrylate, dimethylaminopropyl (meth)acrylate, 2-hydroxydimethylaminopropyl (meth)acrylate, dimethylaminoethyl (meth)acrylamide, dimethylaminopropyl (meth)acrylamide, and 2-hydroxydimethylaminopropyl (meth)acrylamide. The products of quaternization of these monomers with such conventional quaternizing agents as methyl chloride, methyl bromide, ethyl chloride, ethyl bromide, benzyl chloride, benzyl bromide, dimethylsulfuric acid, and diethylsulfuric acid are other examples. One member or a mixture of two or more members suitably selected from the group of vinyl monomers cited above can be used.

Examples of the vinyl monomer convertible into the structural unit (B) in the same method (a) include methyl (meth) acrylate, ethyl (meth)acrylate, n-propyl (meth)acrylate, isopropyl (meth)acrylate, n-butyl (meth)acrylate, isobutyl (meth)acrylate, sec-butyl (meth)acrylate, 2-ethylhexyl (meth)acrylate, n-octyl (meth)acrylate, dodecyl (meth)acrylate, octadecyl (meth)acrylate, cyclohexyl (meth)acrylate, benzyl (meth)acrylate, methoxy (poly)propylene glycol (meth) acrylate, phenoxy (poly)ethylene glycol (meth)acrylates, dodecyl (meth)acrylamide, styrene, p-methylstyrene, propylvinyl ether, and vinyl acetate. One member or a mixture of two or more members suitably selected from the vinyl monomers cited above can be used.

As concerns the polymers available for the modification in the method (b), those to be used for the reaction of aminoethylation include copolymers of vinyl monomers convertible into the structural unit (B) with (meth)acrylic acid such as, for example, methyl (meth)acrylate-(meth)acrylic acid copolymers and styrene-(meth)acrylic acid copolymers, those to be used for the reaction of interesterification include ester bond-containing polymers such as, for example, methyl (meth)acrylate polymers and ethyl (meth)acrylate polymers, and those to be used for the reaction of amide exchange or the Minnich reaction include copolymres of vinyl monomers convertible into the structural unit (B) with (meth)acrylamides such as, for example, methyl (meth)acrylate-(meth)acrylamide copolymers and styrene-(meth)acrylamide copolymers.

The copolymer effectively used as the flotation collector contemplated by the present invention has the structural unit (A) and the structural unit (B) as main component units thereof. In addition to the structural unit (A) and the structural unit (B), this copolymer may contain other structural unit (C) in a proportion incapable of impairing the effect of this invention, preferably in a ratio of less than 20 mol % based on the unit in the copolymer. Examples of the vinyl monomer capable of constituting the other structural unit (C) include (meth)acrylic acid, (meth)acrylamide, N-methylol (meth)acrylamide, and acrylonitrile.

The proportions of the component structural units in the copolymer fall in the respective ranges of (A) 2 to 95 mol %, preferably 5 to 90 mol %, (B) 5 to 98 mol %, preferably 10 to 95 mol %, and (C) 0 to 50 mol %, preferably 0 to 20 mol %, providing that the total of the proportions of the component structural units (A), (B), and (C) is 100 mol %.

If the proportion of the structural unit (A) is less than 2 mol %, the copolymer is susceptible of the influences of the salt concentration, temperature, and pH of the water system under the flotative treatment and, therefore, incapable of stably manifesting the outstanding quality as a flotation collector. If the proportion of the structural unit (A) exceeds 95 mol %, the produced copolymer fails to manifest sufficiently the inherent quality as a flotation collector in the recovery of inorganic substances. When the water system under treatment happens to be a geothermal water which has a water-soluble salt concentration of not less than 1,000 ppm and a temperature of not less than 70° C, thorough separation for removal of the silica from the geothermal water cannot be attained where the proportion of the structural unit (A) is less than 2 mol % in the copolymer. Conversely, if the proportion of the structural unit (A) exceeds 95 mol %, the produced copolymer added for the purpose of flotative treatment to the geothermal water fails to effect complete flotation of the silica and suffers part of the silica to remain in the treated geothermal water and, therefore, manifests no ample effect in flotative separation and removal.

The molecular weight of the copolymer usable effectively as the flotation collector of the present invention is in the range of 1,000 to 1,000,000, desirably 2,000 to 500,000, and most desirably 4,000 to 250,000.

The production of the copolymer of this invention is accomplished by either of the aforementioned methods (a) and (b).

In the method (a), the, copolymerization of the vinyl monomer may be attained by subjecting vinyl monomers, for example, to solution polymerization in a solvent or bulk polymerization as widely practised heretofore in the art. The copolymer resulting from this polymerization may be neutralized with an acid or converted into a quaternary ammonium salt with a quaternizing agent so as to be used as a collector.

Examples of the solvent to be used for this polymerization include water; lower alcohols such as methyl alcohol, ethyl alcohol, and isopropyl alcohol; aromatic and aliphatic hydrocarbons such as benzene, toluene, xylene, cyclohexane, and n-hexane; ethyl acetate; ketones such as acetone and methylethyl ketone; and varying mixtures of the solvent mentioned above. The solvent thus used, when necessary, may be separated and removed from the reaction system or displaced with some other solvent during the course of or subsequently to the polymerization.

As an initiator for this polymerization, a persulfate such as ammonium persulfate or sodium persulfate, a peroxide such as benzoyl peroxide, or an azo compound such as 2,2′-azobisisobutyronitrile can be used. The amount of the polymerization initiator to be used is in the range of 0.05 to 10% by weight, preferably 0.1 to 6% by weight, based on the total amount of monomers being used.

The polymerization temperature is generally in the range of 0° to 150° C, preferably 30° to 130° C., though it may be suitably varied by the kind of solvent and that of polymerization initiator to be used.

The neutralization or quaternization of the copolymer is carried out either immediately after completion of the polymerization or subsequently to displacement of the used solvent with some other solvent as generally practised heretofore in the art. Examples of the neutralizer are acetic acid, hydrochloric acid, and sulfuric acid. Examples of, the. quaternizer include methyl chloride, ethyl bromide, dimethyl sulfate, and benzyl chloride.

The polymer used for the modification in the method (b) can be obtained by polymerizing a corresponding monomer by following the same procedure as used in the method (a).

The production of the copolymer useful as the flotation collector of the present invention by the modification through the reaction of aminoethylation may be effected by causing a copolymer of a vinyl monomer convertible into the structural unit (B) mentioned above and (meth)acrylic acid to undergo aminoethylation with ethylene imine, preferably in a solvent such as alcohol and, when necessary, further neutralizing or quaternizing the product of aminoethylation.

The ester bond-containing polymer such a methyl (meth)acrylate polymer can be modified into a copolymer useful as a flotation collector of the present invention by the reaction of interesterification to be performed by the conventional method using hydroxyethyl dimethylamine or hydroxyethyl trimethyl ammonium chloride, for example.

The copolymer of a vinyl monomer convertible into the structural unit (B) and (meth)acrylamide such as, for example, styrene-(meth)acrylamide copolymer, can be modified into a copolymer useful as a flotation collector of the present invention by the reaction of amide exchange with aminopropyl dimethylamine or aminopropyl trimethyl ammonium chloride, for example, or by the Mannich reaction utilizing the reaction of the copolymer with formalin and dimethylamine.

The flotation collector of the present invention is used in accordance with the conventional procedure heretofore employed for the flotative treatment. The flotation may be carried out, for example, by adding the collector of this invention to a given water system having inorganic, substances such as varying mineral substances suspended or dissolved in the form of fine particles or ions and subsequently introducing froth into the water system. Specifically, the operation of flotation comprises preparatorily adding the collector to the water system under treatment, stirring the collector-containing water system, and forwarding the stirred mixture to a flotation machine or supplying the water system under treatment and the collector simultaneously to the flotation machine, introducing froth into the collector-containing water system, and subsequently separating for removal or recovery the inorganic substances such as silica which are consequently caused to float to the upper layer of the water system under treatment.

The amount of the collector of the present invention to be used in the operation is not specifically defined but may be suitably selected in accordance with the kind, water content, or particle size of the inorganic substances to be collected from the water system under treatment. Generally, this amount is in the range of 1 to 20,000 mg, preferably 2 to 1,000 mg, per liter of the water system under treatment.

Examples of the inorganic substances for which the flotation collector of this invention is used include various minerals such as ores containing sulfides like chalcopyrite and zincblende, ores containing oxides like ilmenite and manganese minerals, ores containing phosphates like apatite, ores containing halides like fluorite and sylvite, and ores containing sulfates like barite. Besides these minerals, silica in the geothermal water and various inorganic substances entrained in waste water and sewage are other examples. The collector of this invention can be effectively used in the flotative selection, removal or recovery of such inorganic substances. Particularly when silica is to be separated for removal from geothermal water having a temperature exceeding 70° C and a water-soluble inorganic salt content of not less than 1,000 ppm or when silica is to be removed from the waste water emanating from a semiconductor manufacturing plant and containing the alkali hydrolyzate of a silicon halogenide or from the iron chloride-containing acid washings emanating from a steel material manufacturing plant, the flotation collector of this invention is effectively used.

Further, the collector of this invention can be used safely in combination with any of various conventional conditioning agents such as a frothing agent, a pH adjusting agent like acid or alkali, and a dispersant and a flocculant serving to promote selection by dispersion and flocculation or even with any of the conventional collectors.

Now, the present invention will be described below with reference to working examples and controls. It should be noted, however, that the present invention is not limited only to these examples.

EXAMPLE 1

An autoclave (made of SUS 316) having an inner volume of 1.5 liters was charged with 200 g of isopropyl alcohol (hereinafter referred to as "IPA") and, subsequently to displacement of the internal air thereof with nitrogen gas, heated to 100° C.

A mixed solution of 80.0 g (0.8 mol) of methyl methacrylate and 125.6 g (0.8 mol) of dimethylaminoethyl methacrylate as vinyl monomers was fed to the autoclave over a period of one hour. At the same time, a solution of 1.50 g of 2,2'-azobisisobutyronitrile in 50 g of IPA was fed as a polymerization initiator to the autoclave over a period of 1.5 hours. The polymerization consequently initiated was continued for two hours and stopped. The autoclave was then cooled. Consequently, the copolymer was obtained in the form of an IPA solution. On analysis by gas .chromatography, the conversions of both monomers were found to be not less than 99.5%.

Then, the IPA solution of copolymer was neutralized with an aqueous hydrochloric acid solution to pH 6.0 and distilled to expel IPA and obtain an aqueous solution of copolymer (1). On analysis by gel permeation chromatography (GPC method) using polyethylene glycol as a standard, this copolymer (1) was found to have a molecular weight of 33,000.

EXAMPLE 2

An autoclave (made of SUS 316) having an inner volume of 1.5 liters was charged with 150 g of toluene, 80.0 g (0.8 mol) of methylmethacrylate, 125.6 g (0.8 mol) of dimethylaminoethyl methacrylate, and 0.30 g of 2,2'-azobisisobutyronitrile and, subsequently to displacement of the internal air thereof with nitrogen gas, heated to 70° C. In eight hours after the elevation of temperature was started, the viscosity of the reaction solution rose so much as to render further stirring difficult. So, the reaction solution was diluted with 75 g of toluene and left reacting for five hours, to produce the copolymer in the form of a toluene solution. On analysis by gas chromatography, the conversions of the monomers were found both to be not less than 98.5%.

Then, this toluene solution of copolymer was neutralized with an aqueous hydrochloric acid solution to pH 6.0 and distilled to expel toluene and produce an aqueous solution of the copolymer (2). On analysis by the GPC method using polyethylene glycol as a standard, this copolymer (2) was found to have a molecular weight of 210,000.

EXAMPLE 3

A copolymer (3) having a molecular weight of 32,000 was obtained in the form of an aqueous solution by following the procedure of Example 1, except that a mixed solution of 180.0 g, (1.8 mols) of methyl methacrylate and 28.3 g (0.18 mol) of dimethylaminoethyl methacrylate as vinyl monomers was used instead.

EXAMPLE 4

A copolymer (4) having a molecular weight of 37,000 was obtained in the form of an aqueous solution by following the procedure of Example 1, except that a mixed solution of 127.8 g (0.9 mol) of n-butyl methacrylate and 94.2 g (0.6 mol) of dimethylaminoethyl methacrylate as vinyl monomers was used instead.

EXAMPLE 5

A copolymer (5) having a molecular weight of 40,000 was obtained in the form of an aqueous solution by following the procedure of Example 1, except that a mixed solution of 56.8 g (0.4 mol) of n-butyl methacrylate and 188.4 g (1.2 mols) of dimethylaminoethyl methacrylate as vinyl monomers was used instead.

EXAMPLE 6

A copolymer (6) having a molecular weight of 4,300 was obtained in the form of an aqueous solution by following the procedure of Example 1, except that a mixed solution of 56.8 g (0.4 mol) of n-butyl methacrylate and 188.4 g (1.2 mols) of dimethylaminoethyl methacrylate as vinyl monomers and 14.0 g of 2,2'-azobisisobutyronitrile were used instead.

EXAMPLE 7

A copolymer (7) having a molecular weight of 42,000 was obtained in the form of an aqueous solution by following the procedure of Example 1, except that a mixed solution of 153.6 g (1.2 mols) of n-butyl acrylate and 114.4 g (0.8 mol) of dimethylaminoethyl acrylate as vinyl monomers was used instead.

Example 8

A copolymer (8) having a molecular weight of 33,000 was obtained in the form of an aqueous solution by following the procedure of Example 1, except that a mixed solution of 101.6 g (0.4 mol) of n-dodecyl methacrylate and 94.2 g (0.6 mol) of dimethylaminoethyl methacrylate as vinyl monomers was used instead.

EXAMPLE 9

A copolymer (9) having a molecular weight of 35,000 was obtained in the form of an aqueous solution by bubbling the same IPA solution of copolymer as produced in Example 1 with methyl chloride thereby effecting quaternization of the copolymer (quaternization ratio about 90%) and subsequently displacing the IPA with water.

EXAMPLE 10

A copolymer (10) having a molecular weight of 40,000 was obtained in the form of an aqueous solution by following the procedure of Example 1, except that a mixed solution of 154.4 g (0.4 mol) of n-dodecyl polyethylene glycol methacrylate (containing an average of 3 mols of ethylene oxide unit per molecule) and 94.2 g (0.6 mol) of dimethylaminoethyl methacrylate as vinyl monomers was used instead.

EXAMPLE 11

A copolymer (11) having a molecular weight of 32,000 was obtained in the form of an aqueous solution by following the procedure of Example 1, except that a mixed solution of 96.0 g (0.4 mol) of n-dodecyl acrylamide and 94.2 g (0.6 mol) of dimethylaminoethyl methacrylate as vinyl monomers was used instead.

EXAMPLE 12

A copolymer (12) having a molecular weight of 42,000 was obtained in the form of an aqueous solution by following the procedure of Example 1, except that a mixed solution of 83.2 g (0.8 mol) of styrene and 188.4 g (1.2 mols) of dimethylaminoethyl methacrylate as vinyl monomers was used instead.

EXAMPLE 13

A copolymer in the form of an aqueous solution was obtained by following the procedure of Example 1, except that 127.8 g (0.9 mol) of n-butyl methacrylate and 51.6 g (0.6 mol) of methacrylic acid as vinyl monomers was used instead. The conversions of the monomers were found both to be not less than 99.5%.

Then, this IPA solution of copolymer was kept at 35° C. and 28.4 g(0.66 mol) of ethylene imine was added thereto over a period of two hours. The resultant mixture was heated to 75° C and kept at this temperature for five hours to effect aminoethylation of the copolymer. The unaltered carboxyl group content of the aminoethylated copolymer was found to be 8 mol %.

The IPA solution of the aminoethylated copolymer was neutralized with an aqueous hydrochloric acid solution to pH 6.0 and distilled to expel IPA and obtain an aqueous solution of copolymer (13). On analysis by the GPC method, this copolymer (13) was found to have a molecular weight of 32,000.

EXAMPLE 14

A copolymer in the form of an IPA solution was obtained by following the procedure of Example 1, except that a mixed solution of 62.4 g (0.6 ml) of styrene and 99.4 g (1.4 mols) of acrylamide as vinyl monomers was used instead. This solution was distilled to expel the IPA, displaced with water to form an aqueous solution of 10% by weight of copolymer, and subjected to the Mannich reaction. This Mannich reaction was carried out by adjusting the aqueous solution of copolymer to pH 12 with calcium hydroxide, mixing the aqueous solution with 114 g (1.4 mols) of an aqueous 37 wt % formalin solution, subjecting the resultant mixture to conversion into methylol at 40° C for one hour, mixing the product of this conversion with 144 g (1.6 mols) of an aqueous 50 wt % dimethylamine solution, and allowing the reaction to continue at 40° C for two hours. The unaltered acrylamide content was found to be 8 mol %. By adjusting the product of the Mannich reaction with an aqueous hydrochloric acid solution to pH 6.0, a copolymer (14) having a molecular weight of 27,000 was obtained.

CONTROL 1

A copolymer (1) for comparison having a molecular weight of 36,000 was obtained in the form of an aqueous solution by following the procedure of Example 1, except that 219.8 g (1.4 mols) of dimethylaminoethyl methacrylate was used as a vinyl monomer.

EXAMPLES 15 to 28

A synthetic geothermal water to be used in testing a flotation collector for performance was prepared as follows. This geothermal water was treated with a given collector for flotative separation of silica to test the collector for performance.

In 500 g of deionized water, 4.73 g (1 g as $SiO_2$) of sodium metasilicate nonahydrate ($Na_2SiO_3.9H_2O$), 15 g of sodium chloride (NaCl), 2 g of potassium chloride (KCl), and 0.5 g of sodium sulfate ($Na_2SO_4$) were dissolved. The resultant solution was adjusted to pH 7.0 with an aqueous hydrochloric acid solution. Then, this solution and a solution of 1.5 g of calcium chloride ($CaCl_2$) and 0.02 g of magnesium chloride ($MgCl_2$) in 100 g of deionized water were combined. The resultant mixed solution was adjusted to pH 6.5 with an aqueous hydrochloric acid solution and then diluted with deionized water to a total volume of 1,000 g to afford the aforementioned geothermal water.

This synthetic geothermal water was kept at 80° C. for one hour. To the aliquot parts of this hot geothermal water, the aqueous solutions of copolymers (1) to (14) obtained in Examples 1 to 14 were added in amounts such that the copolymers (1) to (14) would be contained therein in a fixed concentration of 100 ppm. The resultant mixtures were each immediately fed to a flotation machine, held at 80° C, and aerated for five minutes. The polymeric silica, which consequently rose to the upper layer of the geothermal water was separated and removed.

The total amount of silica ($SiO_2$) in the synthetic geothermal water after use in the flotative treatment and the amount of dissolved silica in the filtrate obtained by passing the used synthetic geothermal water through 0.45-micron membrane filter were determined by the molybdenum yellow method to find the amount of residual polymeric silica in the used synthetic geothermal water from the difference between the total silica concentration and the dissolved silica concentration. The results of the test for the residual polymeric silica are shown in Table 1. The desirability of the performance (efficiency of recovery and selection) of the collector used increases with the decreasing value of the amount of this residual polymeric silica.

CONTROLS 2 to 4

The flotation described in Examples 15 to 28 was repeated faithfully, except that the polymer (1) for comparison obtained in Control 1, laurylamine hydrochloride, and tallow amine hydrochloride were used in a fixed concentration of 100 ppm in place of the copolymers (1) to (14), to test for collector performance. The results of the determination of the residual polymeric silica are shown in Table 1.

TABLE 1

| | Reagent used as collector | Amount of residual polymeric silica (ppm) |
|---|---|---|
| Example 15 | Copolymer (1) | 1 |
| Example 16 | Copolymer (2) | 12 |
| Example 17 | Copolymer (3) | 43 |
| Example 18 | Copolymer (4) | 4 |
| Example 19 | Copolymer (5) | 17 |
| Example 20 | Copolymer (6) | 59 |
| Example 21 | Copolymer (7) | 31 |
| Example 22 | Copolymer (8) | 13 |
| Example 23 | Copolymer (9) | 3 |
| Example 24 | Copolymer (10) | 15 |
| Example 25 | Copolymer (11) | 34 |
| Example 26 | Copolymer (12) | 9 |
| Example 27 | Copolymer (13) | 4 |
| Example 28 | Copolymer (14) | 19 |
| Control 2 | Polymer (1) for comparison | 640 |
| Control 3 | Laurylamine hydrochloride | 460 |
| Control 4 | Tallow amine hydrochloride | 530 |

It is clearly noted from Table 1 that in the capacity for effecting a flotative treatment in a water system containing salts in high concentrations and having a high temperature, the flotation collectors of the present invention are decidedly superior to the conventional collectors, i.e. the long chain alkylamine hydrochlorides or the polymer (1) for comparison which is a homopolymer of dimethylaminoethyl methacrylate.

EXAMPLE 29

About 800 ml of a synthetic geothermal water obtained from the copolymer (1) in the same manner as in Example 15, used in a flotative treatment, and kept at 80° C. was introduced into a heat exchanger formed of a Liebig condenser provided with a jacket for circulation of hot water at 50° C. and allowed to flow down the interior of this heat exchanger at a flow volume of 5 ml/min. After completion of the passage of the synthetic geothermal water, the wall surface of the heat exchanger exposed to contact with the water, on visual examination, showed absolutely no sign of defilement.

CONTROL 5

The operation of Example 29 was faithfully repeated, except that a synthetic geothermal water produced from the polymer (1) for comparison in the same manner as in Control 2, used in a flotative treatment, and ketp at 80° C was used instead for passage through the interior of the heat exchanger. The inner surface of the heat exchanger, on visual observation, showed a white solid substance deposited throughout the entire surface.

EXAMPLES 30 to 32

A synthetic geothermal water to be used in testing a flotative collector for performance was prepared as follows. This geothermal water was treated with a given collector for flotative separation of silica to test the collector for performance.

In 500 g of deionized water, 2.37 g (0.5 g as $SiO_2$) of sodium metasilicate nonahydrate ($Na_2SiO_39H_2O$), 0.5 g of sodium chloride (NaCl), 0.5 g of potassium chloride (KCl), and 0.1 g of sodium sulfate ($Na_2SO_4$) were dissolved. The resultant solution was adjusted to pH 7.0 with an aqueous hydrochloric acid solution. This solution and a solution of 0.1 g of calcium chloride ($CaCl_2$) in 100 g of deionized water were combined. The mixed solution was adjusted to pH 6.5 with an aqueous hydrochloric acid solution and then diluted with deionized water to a total volume of 1,000 g to obtain the synthetic geothermal water. The flotation performed in Examples 15 to 28 was faithfully repeated, except that the synthetic geothermal water was kept at 80° C for one hour, and to the aliquot parts of the hot synthetic geothermal water, the aqueous solutions of copolymers (1), (7), and (10) obtained in Examples 1, 7, and 10 were added in such amounts that the copolymers (1), (7), and (10) would be contained therein in a fixed concentration of 5 ppm. Thus, the copolymers were tested for performance as flotative collectors.

The results of the test for residual polymeric silica are shown in Table 2.

CONTROLS 6 and 7

The flotation performed in Example 30 was faithfully repeated, except that the polymer (1) for comparison obtained in Control 1 or laurylamine hydrochloride was used in a final concentration of 5 ppm, to test the polymer or the hydrochloride for flotative performance. The results of the test for residual polymeric silica are shown in Table 2.

TABLE 2

| | Reagent used as collector | Amount of residual polymeric silica (ppm) |
|---|---|---|
| Example 30 | Copolymer (1) | 5 |
| Example 31 | Copolymer (7) | 9 |
| Example 32 | Copolymer (10) | 7 |
| Control 6 | Polymer (1) for comparison | 92 |
| Control 7 | Laurylamine hydrochloride | 87 |

EXAMPLES 33 to 35

To the 1-liter aliquot parts of acid washings emanating from the washing of steel sheets with hydrochloric acid and containing 170 g of iron, 57 g of free hydrochloric acid, and 130 mg of silica per liter, the aqueous solutions of copolymers (2), (4), and (12) obtained in Examples 2, 4, and 12 were added in amounts such the copolymers (2), (4), and (12) would be contained therein in a fixed concentration of 20 ppm. The resultant mixtures were subjected to flotation at 20° C. for five minutes. The, pplymeric silica which consequently rose to the upper layer of the acid washings was separated and removed.

The amount of silica remaining in the acid washings after the flotation was determined by the atomic absorption method. The results are shown in Table 3.

CONTROLS 8 and 9

The flotation performed in Example 33 was faithfully repeated, except that the polymer (1) for comparison obtained in Control 1 or tallow amine hydrochloride was used in place of the copolymer (2) in an amount such that the polymer or the hydrochloride would be contained in a final concentration of 20 ppm, to test for flotative performance. The results of the test for the amount of silica remaining in the effluent from the flotation are shown in Table 3.

TABLE 3

| | Reagent used as collector | Amount of residual silica (ppm) |
|---|---|---|
| Example 33 | Copolymer (2) | 23 |
| Example 34 | Copolymer (4) | 15 |
| Example 35 | Copolymer (12) | 31 |
| Control 8 | Polymer (1) for comparison | 119 |
| Control 9 | Tallow amine hydrochloride | 101 |

EXAMPLES 36 to 38

Two liters of an aqueous 1 wt % sodium hydroxide solution was bubbled with nitrogen gas containing trichlorosilane and then adjusted to pH 7.0 with dilute hydrochloric acid to effect hydrolysis of the trichlorosilane absorbed in the solution. The solution resulting from the hydrolysis of trichlorosilane was found to contain 0.09% by weight of silica and 1.4% by weight of sodium chloride.

To the 1-liter aliquot parts of the solution obtained by the hydrolysis, the aqueous solutions of copolymers (6), (13), and (14) obtained in Examples 6, 13, and 14 were added in amounts such that the copolymers (6), (13), and (14) would be contained therein in a fixed concentration of 100 ppm. The solutions were immediately supplied to a flotation machine and aerated with air at 20° C for five minutes. The polymeric silica which consequently rose to the upper layer of the solution was separated and removed.

The total amount of silica ($SiO_2$) in the solution after the flotation and the amount of dissolved silica in the filtrate obtained by passing the used solution through a 0.45-micron membrane filter were determined by the molybdenum yellow method. The amount of the polymeric silica remaining in the solution after the flotation was found from the difference between the total silica concentration and the dissolved silica concentration. The results of the test for the residual polymeric silica are shown in Table 4. The desirability of the performance of a collector increases with the decreasing amount of this residual polymeric silica.

CONTROLS 10 and 11

The flotation performed in Example 36 was faithfully repeated, except that the polymer (1) for comparison or tallow amine hydrochloride was used in place of the copolymer (6) in an amount such that the polymer (1) or the hydrochloride would be contained in a final concentration of 100 ppm, to test for flotative performance. The amount of polymeric silica remaining in the solution after the flotation was determined. The results of this determination are shown in Table 4.

TABLE 4

| | Reagent used as collector | Amount of residual polymeric silica (ppm) |
|---|---|---|
| Example 36 | Copolymer (6) | 24 |
| Example 37 | Copolymer (13) | 12 |
| Example 38 | Copolymer (14) | 9 |
| Control 10 | Polymer (1) for comparison | 820 |
| Control 11 | Tallow amine hydrochloride | 710 |

INDUSTRIAL APPLICABILITY

The flotation collector of the present invention effects flotative recovery in a high ratio and flotative separation with high efficiency at a small application ratio, retains the outstanding capacity for flotation intact even when the water system under treatment contains water-soluble inorganic salts at a high concentration, and permits effective use in a wide pH range at high temperatures.

In the field in which the conventional flotation collector is applicable only with difficulty because the collector itself fails to manifest the effect thereof sufficiently or because the water system under treatment has an intolerably high temperature, contains salts in an unduly high concentration, or necessitates complicated pH adjustment as in the case of the flotation separation and removal of silica from geothermal water, the flotation collector of the present invention can be used effectively without entailing any difficulty.

When the geothermal water is treated for separation and removal of silica therefrom by the method of this invention using the collector also of this invention, the complicate work involved in the adjustment of pH value of the geothermal water prior to the treatment is no longer required and the effectiveness of the treatment in the separation and removal of silica is not impaired at all even when the temperature of the geothermal water exceeds 70° C. during the course of treatment. When the geothermal water which has been treated by the present invention is used for geothermal power generation, for example, absolutely no deposition of silica scale occurs in conduits, heat exchangers, or return wells while the treatment is in progress. Thus, this invention contributes greatly to enhancing the utilization of geothermal energy.

We claim:

1. A method for the treatment of an inorganic substance-containing water system, which method comprises adding to said inorganic substance-containing water system a copolymer having an average molecular weight in the range of 1,000 to 1,000,000 and comprising (A) 2 to 95 mol % of a structural unit represented by the general formula I:

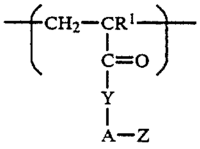
(I)

wherein $R^1$ is hydrogen atom or methyl group, Y is —O—, A is an alkylene group of 1 to 4 carbon atoms, and Z is

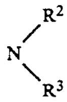 or 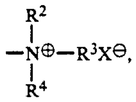

wherein $R^2$, $R^3$ and $R^4$ are independently hydrogen atom, alkyl group of 1 to 12 carbon atoms, or aralkyl group of 7 to 10 carbon atoms, and $X^\ominus$ is anion pair, (B) 5 to 98 mol % of a structural unit represented by the general formula II:

(II)
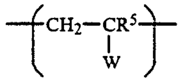

wherein $R^5$ is hydrogen atom or methyl group, W is aryl group of 6 to 8 carbon atoms or 0

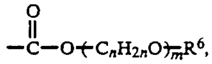

wherein n is an integer in the range of 2 to 4 and m is 0 or an integer in the range of 1 to 20, and $R^6$ is alkyl group of 1 to 18 carbon atoms, cycloalkyl group of 5 to 8 carbon atoms, aralkyl group of 7 to 10 carbon atoms, or aryl group of 6 to 18 carbon atoms, and (C) 0 to 50 mol % of other structural unit, providing that the total amount of said structural units (A), (B), and (C) is 100 mol %, in a proportion in the range of 1 to 20,000 mg of said copolymer/liter of said inorganic substance-containing water system and subjecting the water system containing the copolymer to flotation to separate the inorganic substances from said water system.

2. A method according to claim 1, wherein said inorganic substance-containing water system is geothermal water.

3. A method according to claim 1, wherein said inorganic substance-containing water system contains iron chloride.

4. A method according to claim 1, wherein said inorganic substance-containing water system contains an alkali hydrolyzate of a silicon halogenide.

5. A method according to any of claims 1 to 4, wherein the amount of said copolymer to be added is in the range of 2 to 1,000 mg/liter.

6. A method according to claim 2, wherein said geothermal water has a temperature of not less than 70° C. and contains water-soluble inorganic salts in a concentration of not less than 1,000 ppm.

7. A method according to claim 1, wherein the proportions of the component structural units (A), (B), and (C) are in the respective ranges of (A) 5 to 90 mol %, (B) 10 to 95 mol %, and (C) 0 to 20 mol %.

8. A method according to claim 1, wherein the average molecular weight of said copolymer is in the range of 2,000 to 500,000.

9. A method according to claim 1, wherein A is alkylene group of 1 to 2 carbon atoms in said general formula I and W is phenyl group or

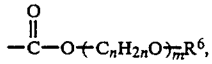

wherein m is O and $R^6$ is alkyl group of 1 to 12 carbon atoms, in said general formula II.

10. A method according to claim 1, wherein A is ethylene group, and Z is $—N(CH_3)_2$ or $—N^\oplus(CH_3)_3X^\ominus$ in said general formula I and W is phenyl group or

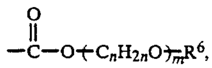

wherein m is 0 and $R^6$ is alkyl group of 1 to 12 carbon atoms, in said general formula II.

* * * * *